United States Patent [19]
Kettunen

[11] 4,124,841
[45] Nov. 7, 1978

[54] MOTION DETECTION DEVICE

[76] Inventor: John Kettunen, 195 W. 24th St., Yuma, Ariz. 85364

[21] Appl. No.: 798,665

[22] Filed: May 19, 1977

[51] Int. Cl.$^2$ ............................................. G08B 13/02
[52] U.S. Cl. .................................... 340/690; 340/566; 200/61.45 R; 200/61.52
[58] Field of Search ......................... 340/282, 283, 261; 200/61.52, 61.45 R

[56] References Cited

U.S. PATENT DOCUMENTS

| | | | |
|---|---|---|---|
| 2,926,223 | 2/1960 | Netterfield | 200/61.52 |
| 3,092,822 | 6/1963 | Dorman | 340/261 |
| 3,706,867 | 12/1972 | Rand et al. | 340/282 |
| 4,039,789 | 8/1977 | Hase | 200/61.52 |

*Primary Examiner*—Glen R. Swann III
*Attorney, Agent, or Firm*—Gregory J. Nelson

[57] ABSTRACT

A device for giving a visual or audible indication of motion such as impact, vibration or the like, which has a contact element supported on a base. When motion occurs, due to earthquake or other causes, a contact element is displaced completing an electrical circuit. In a preferred embodiment, the contact element comprises an elongate pin which topples in response to motion. In another embodiment the contact element may be a spherical element. The device may also be used as an intrusion alarm having an auxiliary member co-operable with the device so that the device can be attached to a door or a window as a trip alarm.

8 Claims, 11 Drawing Figures

MOTION DETECTION DEVICE

BACKGROUND OF INVENTION

The present invention relates to a warning device and more particularly relates to an electrical switch actuated by vibration or movement to warn of an intrusion or an impending earthquake.

Earthquakes, which are due to release of internal energy in the earth's core causing a shift of the magma relative to the core, are generally preceded by relatively mild tremors or vibrations termed "foreshock". The principal earthquake usually follows the initial warning tremors by a short period. A warning at the time the first vibrations occur would give persons time to take some precaution to avoid injury and destruction of property. For example, at the time a warning occurs, individuals can seek safe refuge in interior hallways away from exterior windows where glass breakage can cause injury. Adequate advance warning would also allow people to evacuate high-rise buildings. A warning would be extremely important when a quake occurs at night and people are normally asleep.

SUMMARY OF INVENTION

Accordingly, there exists a need for a simple, yet effective early warning device for alerting individuals to an impending earthquake. The present invention serves as an early warning device and can also be used as intrusion or burglar alarm. Briefly, the present invention comprises an electrical switch having a base and an electrically conductive housing supported on the base. The electrically conductive housing contains appropriate D.C. power sources, such as a battery. One terminal of the battery is connected in a circuit to an appropriate signaling device, such as an audible or visible indicator. A generally planar contact plate is disposed within the electrically conductive housing and is insulated from the housing. The contact plate may be one end of a battery or may be a plate electrically connected to the battery. A contact element such as an elongated pin or ball is supported on the plate. When vibration, shock, or impact occurs, the motion will cause the contact element to be displaced to a position in contact with both plate and the housing so that an electric circuit is established and appropriate warning signal is given. In another embodiment, selective switching between the audible and visible signal alarms is permitted. In still another embodiment of the present invention, the base is constructed having a tripod support arrangement. One of the supporting legs is attachable to a trip intrusion system. Force exerted on the leg will displace the leg, causing the base of the entire unit to tilt, dislodging the contact element and thereby completing the circuit and setting off an alarm.

The above, and other objects and advantages of the present invention will become more apparent from the following specification, claims and drawings in which:

BRIEF DESCRIPTION OF DRAWINGS

Throughout the drawing, the same numerals have been used to identify the same or similar elements.

DETAILED DESCRIPTION

Figure 1:
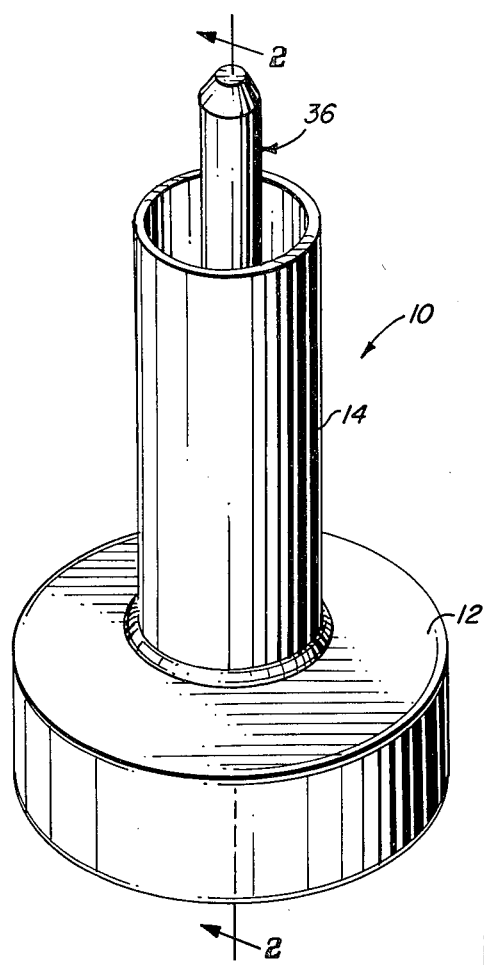
FIG. 1 is a perspective view of the alarm device of the present invention.
Figure 2:
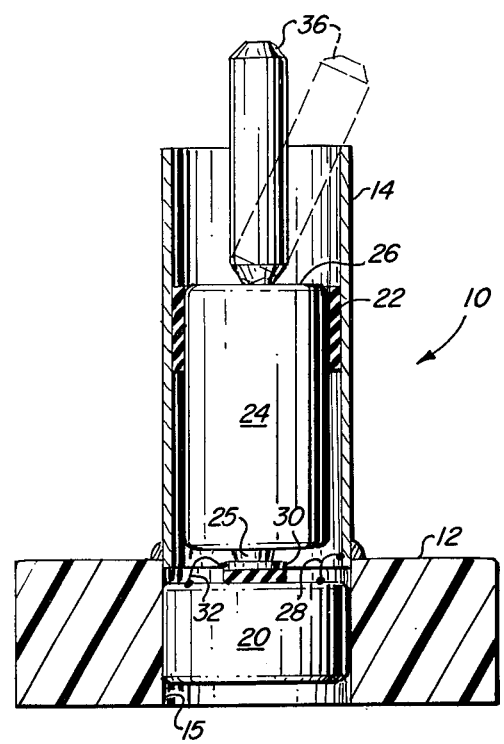
FIG. 2 is a sectional view taken along lines 2—2 of FIG. 1.
Figure 3:
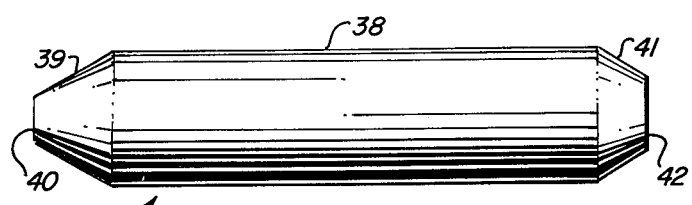
FIG. 3 is an enlarged view of the contact element of the alarm device shown in FIGS. 1 and 2.

Turning now to the drawings, particularly FIGS. 1, 2, and 3, the alarm of the present invention is generally designated by the numeral 10 and includes a generally circular base 12. Base 12 defines a central aperture or recess 15 housing a conventional audible signal device 20, such as a buzzer. A generally cylindrical housing 14 is supported in an upright position concentric on base 12 and aligned with recess 15. Housing 14 is secured to base 12 by an appropriate fastening means which may be an annular bead of cementitious material or other type of mechanical fastener. Housing 14 is fabricated from an electrically conductive material while base 12 is preferrably formed of an insulating material such as a plastic.

Housing 14 is generally cylindrical, having an internal diameter to accommodate a D.C. power source. As shown, the D.C. power source may be conventional batteries such as an alkaline battery cell 24. The interior diameter of the cylindrical housing 14 is slightly larger than battery 24 to accommodate insertion of an insulating spacer 22, placed about the battery 24 to accommodate insertion of an insulating spacer 22. Battery cell 24 is shown as being a conventional battery cell such as a size D cell having first terminal end 25 and an opposite terminal end 26 which is generally flat.

Buzzer 20 is conventional and need not be described in detail. One terminal of buzzer 20 is connected to housing 14 by wire 28. The other terminal of buzzer 20 is connected to conductive plate 30 by lead wire 32. Conductive plate 30 is disposed concentrically at the bottom of holder 14 to align with battery contact 25.

As seen in FIGS. 1 and 2, a contact element shown as a cylindrical contact pin 36 is positionable on terminal surface 26 of battery 24 within holder 14. Contact pin 36 is a conductive material and has an elongate body 38. The first end of the pin is tapered at 39 and terminates at flat end section 40. The opposite end of body 38 is similarly formed as a truncated cone having a tapered section 41 and a flatened end 42. The area of flatened end section 40 is less than the area of flatened end section 42 so the sensitivity of the alarm device may be varied as will be explained. Contact pin 36 is displaced from its normal vertical position, as shown in solid lines in FIG. 2 to a tilted position, as shown shown in dotted lines, establishing contact with the upper edge of holder 14 and the surface 26 of battery 24. In this dislodged or tilted position, contact element 36 completes an electrical circuit through the contact, battery and holder to energize the buzzer.

In use, the alarm device 10 is placed in an appropriate location such as a bedside stand. The contact element 36 is vertically positioned within the holder resting on terminal 26 of battery 24. When a shock, vibration or similar force offers, the motion will cause the contact element 36 to tilt to the actuating position, thereby giving an audible alarm signal. As noted above, the ends of the contact pin 36 may be configured so that the area on which the contact pin rests can be selectively changed. The greater the surface area at the end of 36 for a predetermined length of the pin, the greater the stability of the pin. Therefore, by placing the pin on end 42 in the holder, the sensitivity of the device is less than when pin 36 is supported in a vertical position at end 40.

Figure 4:
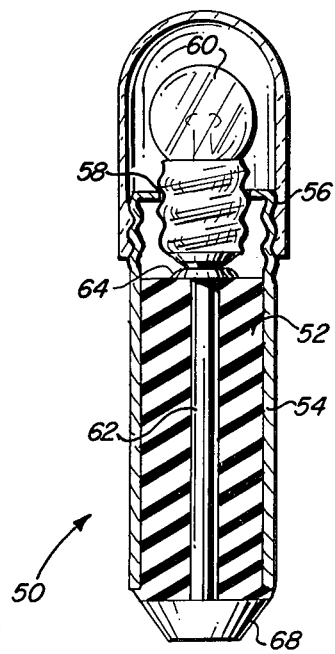
FIG. 4 is a sectional view illustrating an alternate form of the contact element useable in the alarm of the present invention.

FIG. 4 shows another embodiment of the contact pin generally designated by the numeral 50. Contact element or pin 50 has a generally cylindrical body 52, of appropriate insulating material. A conductive metal casing 54 is provided about the body 52. The upper end of casing 54 is provided with exterior threaded section 56. An opening 58 in the upper end of metal casing 56 receives the treads of a conventional lightbulb 60. A metal conductor 62 extends axially through body 52 having an upper terminal 64 contacting the terminal of light 60. A conductor 68 in the form of a truncated cone is provided at the bottom end of body 52 and is connected to conductor 62. Conductor 68 is insulated from the lower edge of casing 54 by insulating material 52.

Contact element 50 may be positioned within holder 14 and explained above. When the contact element 50 is displaced, a circuit is completed through contact 68, element 62 and exterior casing 54, causing the buzzer 20 to be actuated. Light 60 will simultaneously be illuminated. Note, that the casing 54 does not contact element 68 in the upright position so that a circuit will be established only when the contact element is displaced or tilted.

Figure 5:
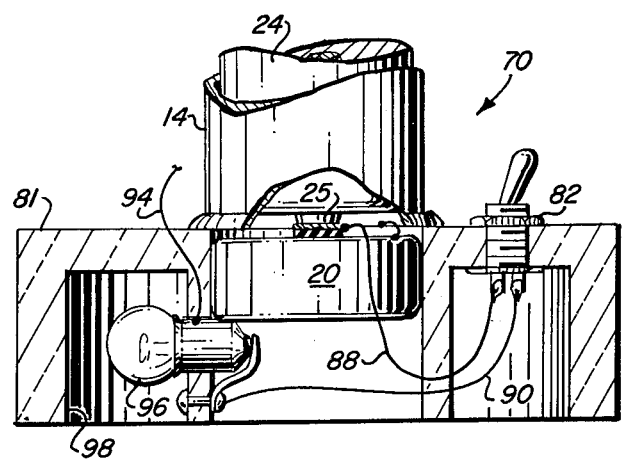
FIG. 5 is a partial sectional view of an alternate embodiment of the present invention, illustrating a portion of the base and housing.

FIG. 5 shows an alternate embodiment in the present invention. The alarm of this embodiment is generally designated by the numeral 70 and includes a light transparent or translucent base member 81. Housing 14 is supported on a base member 81 and is similar to that described with reference to FIGS. 1 and 2. A light 96 is housed within recess 98 in base 81. Buzzer 20 can operably be connected to be actuated when the contact pin is displaced. A conventional toggle pole electrical switch 82 is secured to the upper surface of base 81 having lead wire 88 connected to the lower terminal 25 of the battery. Wire 90 interconnects the switch 82 and light 96. Similarly, the lead wire 94 is attached to light 96 and to the upper battery terminal, not shown. Actuation of switch 82 will cause illumination of light 96 independent of the alarm. This allows the alarm unit 70 to be placed adjacent in individuals bed and allows the alarm to be used as a night light or source of light independent of buzzer 20 by actuating switch 82.

Figure 6:
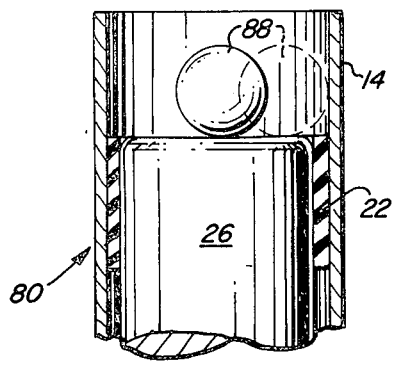
FIG. 6 is a partial sectional view of the upper end of the housing alarm of the present invention showing another form of contact element.

FIG. 6 shows another embodiment of the present invention designated by the numeral 80. Cylindrical, conductive holder 14 contains battery 24. An annular spacer 22 is interposed between battery 24 and cylindrical holder 14. The contact element 88 is shown as a conductive, spherical ball resting on the upper terminal surface 26. In this embodiment, dislodgment of the ball from position shown in FIG. 6 to position shown in dotted lines in FIG. 6 completes the circuit actuating an alarm. The use of a spherical contact element may, in some cases, provide a more sensitive response and actuation of the alarm.

Figure 7:
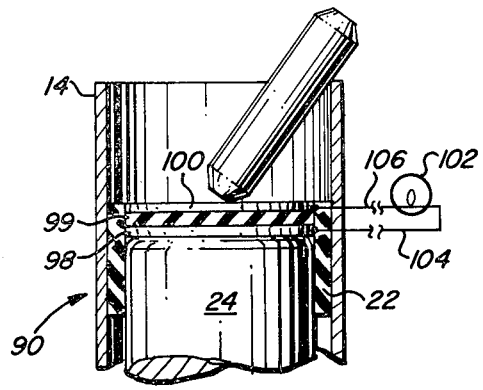
FIG. 7 is a partial sectional view of the upper portion of the housing of the alarm of the present invention, showing an alarm adapted to give visual indication of a condition.

FIG. 7 illustrates still another form of the present invention generally designated by the numeral 90. The alarm 90 includes a cylindrical housing 14 of conductive material. Housing 14 contains battery 24. A conductive plate 98 rests upon the upper terminal end of battery 24. An insulating pad 99 is placed upon disk 98. Conductive disk 100 is, in turn, positioned on top of insulating disk 99. Annular insulating spacer 22 surrounds the upper end of battery 96 and disks 98, 99 and 100. A light 102 is connected to conductive plates 98 and 100 by wires 104 and 106, respectively. It will be appreciated that when a contact element 36 is dislodged or is tipped to position shown in FIG. 7, a circuit will be completed illuminating light 102. The base and other components of this embodiment are as have been shown with reference to FIGS. 1 and 2 and not set forth in detail here. It will be appreciated that buzzer will also be actuated as described above.

Figure 8:
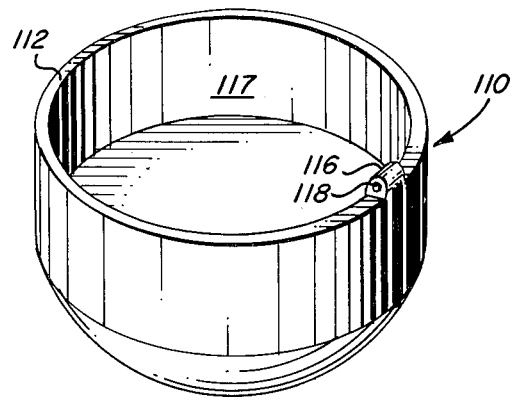
FIG. 8 is a perspective view of a base which may be adapted for use with the present invention to increase the sensitivity of the alarm device.
Figure 9:
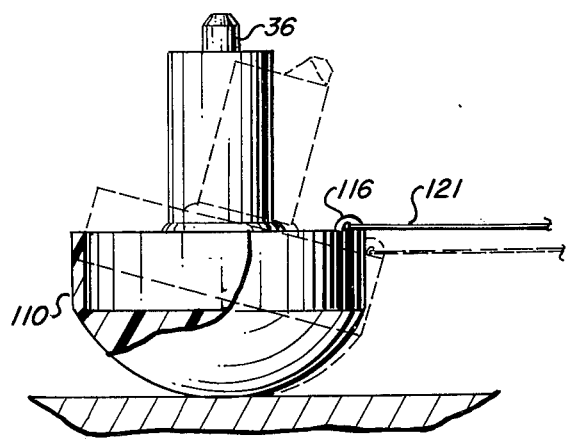
FIG. 9 is an elevational view, partly in broken lines, illustrating operational positioning of device of FIG. 1 positioned in the base shown in FIG. 8 and actuated as a trip alarm.

FIG. 8 shows an auxiliary base 110 which has a generally cylindrical rim 112 defining a recess 116. Recess 116 is sized to accommodate and receive circular base member, for example base 12 of embodiment 10 shown in FIG. 1. An eyelet 116 having an aperture 118 is secured to the sidewall of base 112. The lower surface of base 112 is semi-spherical so that the entire unit "rocks". As best seen in FIG. 9, a trip wire 120 can be secured to aperture 118 in eyelet 116. The opposite end of trip wire 120 can be secured to a door, window or the like. Movement of the door, window, etc., as for example by an intruder, will exert tension on line 120 causing the base 112 to rock. The rocking of base 112 will, in turn, cause the contact pin 36 to be dislodged actuating the alarm.

Figure 10:
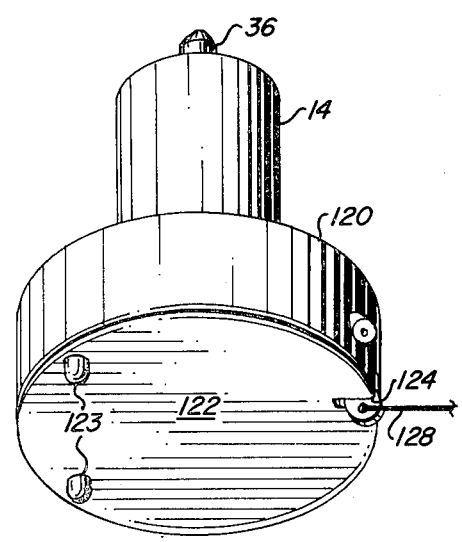
FIG. 10 is a bottom perspective view illustrating another embodiment in the present invention adapted for use as a trip alarm.
Figure 11:
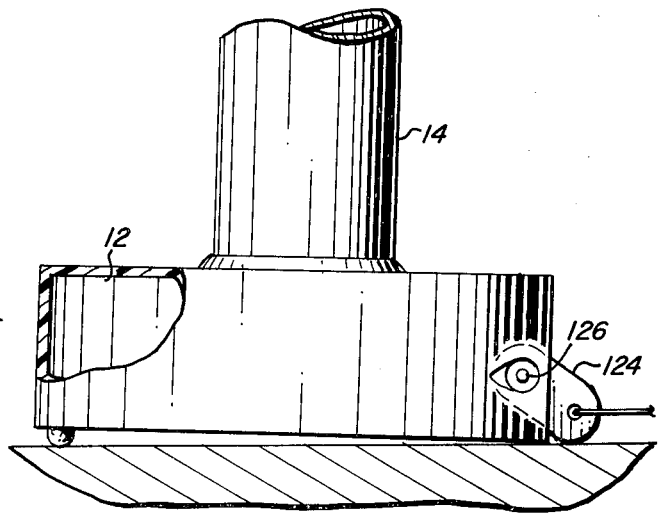
FIG. 11 is a side elevational view of the device of FIG. 10 in an actuated condition.

FIGS. 10 and 11 show another form of base useable with a trip alarm system. The base 120 is generally cylindrical, having a flat bottom surface, 122. Base 120 defines a recess to accommodate the base 12 of, as for example, the unit as shown in FIGS. 1 and 2. Bottom surface 122 carries two fixed legs 123. A third leg 124 is pivotally mounted at pivot pin 126 to base 120. Leg 124 defines an aperture 128 to which an appropriate trip wire 128 can be secured. As best seen in FIG. 11, when force or tension is exerted on trip wire 129, leg 124 will be pivoted outwardly, causing the entire unit to tip, thereby actuating the alarm.

From the foregoing, it will be seen that the present invention provides a compact, simple and highly effective alarm for emitting an audible or visual signal when an earthquake, shock, vibration or the like is encountered. The present device may also serve as an intrusion alarm provided with auxiliary base means actuated by an appropriate trip wire.

It will be understood that various changes may be made in the form, detail, arrangement and proportion of the parts without departing from the spirit and scope of the invention as set forth in the appended claims.

I claim:

1. An alarm for detecting motion and for emitting a signal in response to motion, said alarm comprising:

(a) a base;

(b) an electrically conductive housing supported on said base;

(c) a generally horizontal contact plate electrically insulated from said housing;

(d) a terminal spaced from said contact plate;

(e) a source of electrical energy connected to said contact plate and said terminal;

(f) signal means connected to said terminal and said housing; and (g) a contact element positionable on said contact plate in a first position and responsive to motion and displaceable to a second position establishing an electrical circuit between said housing and said contact plate whereby current flows to said signal means actuating same.

2. The alarm of claim 1 wherein said housing is generally cylindrical and said source of electrical energy comprises at least one battery cell.

3. The alarm of claim 2 wherein said contact element comprises an elongate pin.

4. The alarm of claim 2 wherein said contact element comprises a spherical member.

5. The alarm of claim 3 wherein said pin is tapered at both ends, the degree of taper being different.

6. The alarm of claim 1 further including second signal means and switch means for selectively actuating said second signal means independent of said signal means.

7. The alarm of claim 1 wherein said base has a generally semi-spherical bottom surface.

8. The alarm of claim 1 wherein said base is provided with first, second and third legs supporting said base, one of said legs being pivotally attached to said base and displaceable by force to tilt said alarm thereby actuating said alarm.

* * * * *